(12) United States Patent
Hynes et al.

(10) Patent No.: US 10,792,891 B2
(45) Date of Patent: *Oct. 6, 2020

(54) POLYMER MATRIX-CERAMIC MATRIX HYBRID COMPOSITES FOR HIGH THERMAL APPLICATIONS

(71) Applicant: Composites Horizons, LLC, Pasadena, CA (US)

(72) Inventors: Jeffrey Thomas Hynes, Pasadena, CA (US); Benjamin Jeffrey Hynes, Annapolis, MD (US); Thomas Barrett Jackson, Portland, OR (US); Wilfred Hon, Corona, CA (US)

(73) Assignee: Composites Horizons, LLC, Corvina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,747

(22) Filed: Nov. 20, 2019

(65) Prior Publication Data

US 2020/0254725 A1 Aug. 13, 2020

Related U.S. Application Data

(62) Division of application No. 15/057,971, filed on Mar. 1, 2016, now Pat. No. 10,562,269.

(Continued)

(51) Int. Cl.
*B32B 7/02* (2019.01)
*B32B 9/00* (2006.01)
(Continued)

(52) U.S. Cl.
CPC ............... *B32B 9/005* (2013.01); *B32B 3/14* (2013.01); *B32B 7/02* (2013.01); *B32B 18/00* (2013.01);
(Continued)

(58) Field of Classification Search
CPC .............. B32B 18/00; B32B 2262/101; B32B 2262/105; B32B 2262/106;
(Continued)

(56) References Cited

U.S. PATENT DOCUMENTS 5,558,932 A 9/1996 Scanlon
5,804,306 A 9/1998 Sorenson et al.
(Continued)

OTHER PUBLICATIONS

European Patent Office, International Search Report and Written Opinion issued in related International Patent Application No. PCT/US2016/050866 dated Nov. 28, 2016, 9 pages.

(Continued)

*Primary Examiner* — Lawrence D Ferguson
(74) *Attorney, Agent, or Firm* — Jeffrey G. Sheldon; Katherine B. Sales; Cislo & Thomas LLP

(57) ABSTRACT

A combination of a component and a composite, the composite having a) a PMC layer, and b) a tile layer comprising a plurality of Ox/Ox CMC tiles, each tile having: i) a central portion, ii) an outer portion and iii) one or more overlap joints formed by the overlapping of the outer portions of adjoining tiles so that hot gases entering a smooth top surface of the tile layer between abutting outer and central periphery segments must travel laterally between the overlapping outer portions of adjoining tiles to reach a top surface of the PMC layer. A method of heat shielding a component with a heat shielding composite comprising a) providing the composite and b) applying the composite to a surface of the component.

20 Claims, 4 Drawing Sheets

Related U.S. Application Data

(60) Provisional application No. 62/216,190, filed on Sep. 9, 2015.

(51) Int. Cl.

| | | |
|---|---|---|
| *C04B 35/76* | (2006.01) | |
| *C04B 37/00* | (2006.01) | |
| *B32B 18/00* | (2006.01) | |
| *B64G 1/58* | (2006.01) | |
| *B32B 3/14* | (2006.01) | |
| *B32B 27/06* | (2006.01) | |
| *C08J 5/04* | (2006.01) | |

(52) U.S. Cl.
CPC .............. *B32B 27/06* (2013.01); *B64G 1/58* (2013.01); *C04B 35/76* (2013.01); *C04B 37/00* (2013.01); *C08J 5/04* (2013.01); *B32B 2262/101* (2013.01); *B32B 2262/105* (2013.01); *B32B 2262/106* (2013.01); *B32B 2307/306* (2013.01); *B32B 2605/18* (2013.01); *C04B 2235/3217* (2013.01); *C04B 2235/3225* (2013.01); *C04B 2235/3244* (2013.01); *C04B 2235/3418* (2013.01); *C04B 2235/5248* (2013.01); *C04B 2237/341* (2013.01); *C04B 2237/343* (2013.01); *C04B 2237/345* (2013.01); *C04B 2237/348* (2013.01); *C04B 2237/38* (2013.01); *C04B 2237/385* (2013.01); *C04B 2237/704* (2013.01); *C04B 2237/82* (2013.01); *C08J 2300/00* (2013.01)

(58) Field of Classification Search
CPC .......... B32B 2307/306; B32B 2605/18; B32B 27/06; B32B 3/14; B32B 7/02; B32B 9/005; B64G 1/58; C04B 2235/3217; C04B 2235/3225; C04B 2235/3244; C04B 2235/3418; C04B 2235/5248; C04B 2237/341; C04B 2237/343; C04B 2237/345; C04B 2237/348; C04B 2237/38; C04B 2237/385; C04B 2237/704; C04B 2237/82; C04B 35/76; C04B 37/00; C08J 2300/00; C08J 5/04
See application file for complete search history.

(56) References Cited

U.S. PATENT DOCUMENTS

| | | |
|---|---|---|
| 7,849,779 B1 | 12/2010 | Hansen et al. |
| 8,130,167 B2 | 3/2012 | Glabe et al. |
| 10,562,269 B2 * | 2/2020 | Hynes ............... C04B 37/00 |
| 2007/0292654 A1 | 12/2007 | Bohner et al. |
| 2010/0307104 A1 | 12/2010 | Golliday |
| 2012/0055327 A1 | 3/2012 | Holowczak |
| 2013/0160639 A1 | 6/2013 | Lee |

OTHER PUBLICATIONS

United States Patent and Trademark Office, Non-Final Office Action dated Mar. 21, 2019 in related U.S. Pat. No. 10,562,269, 19 pages.

* cited by examiner

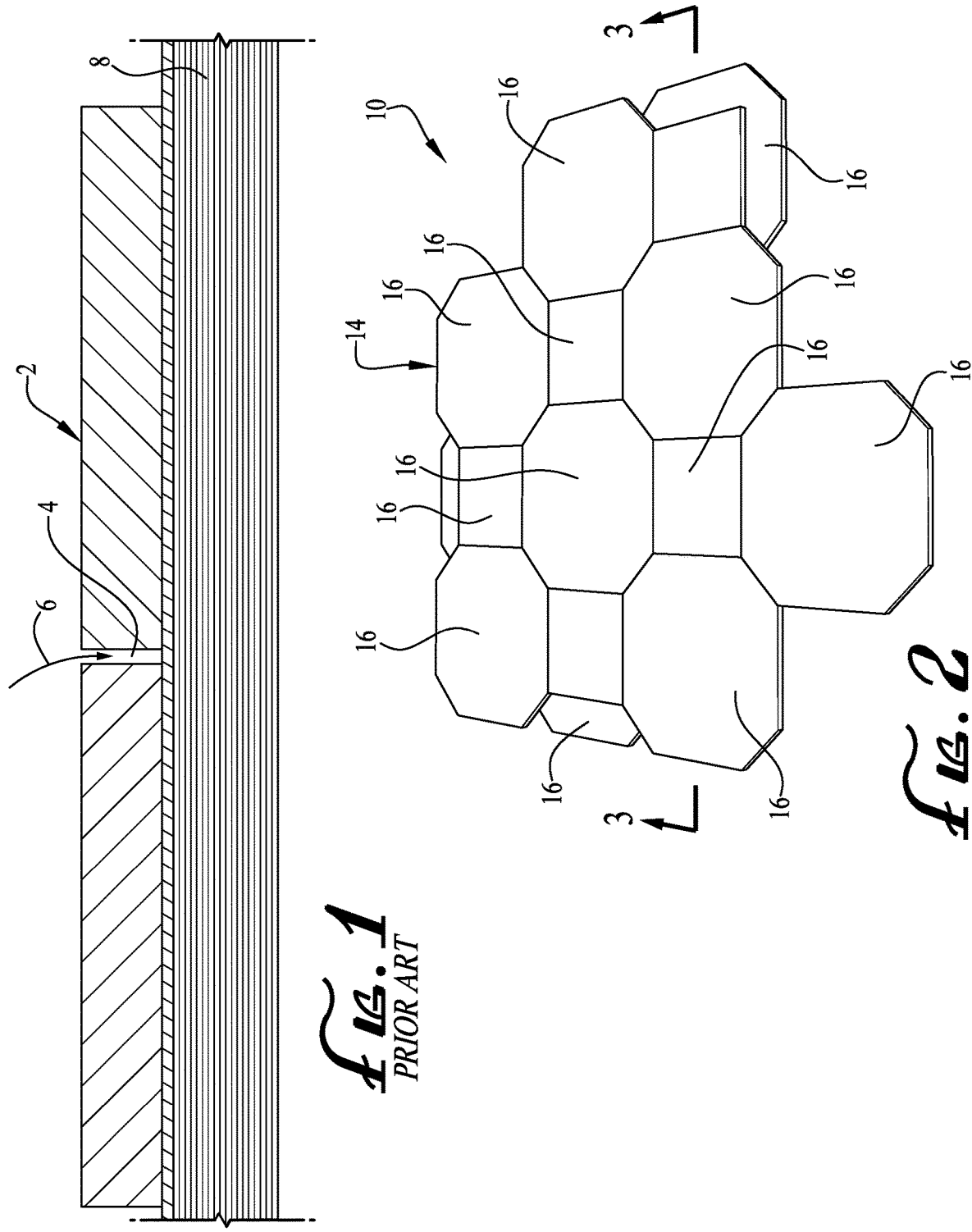

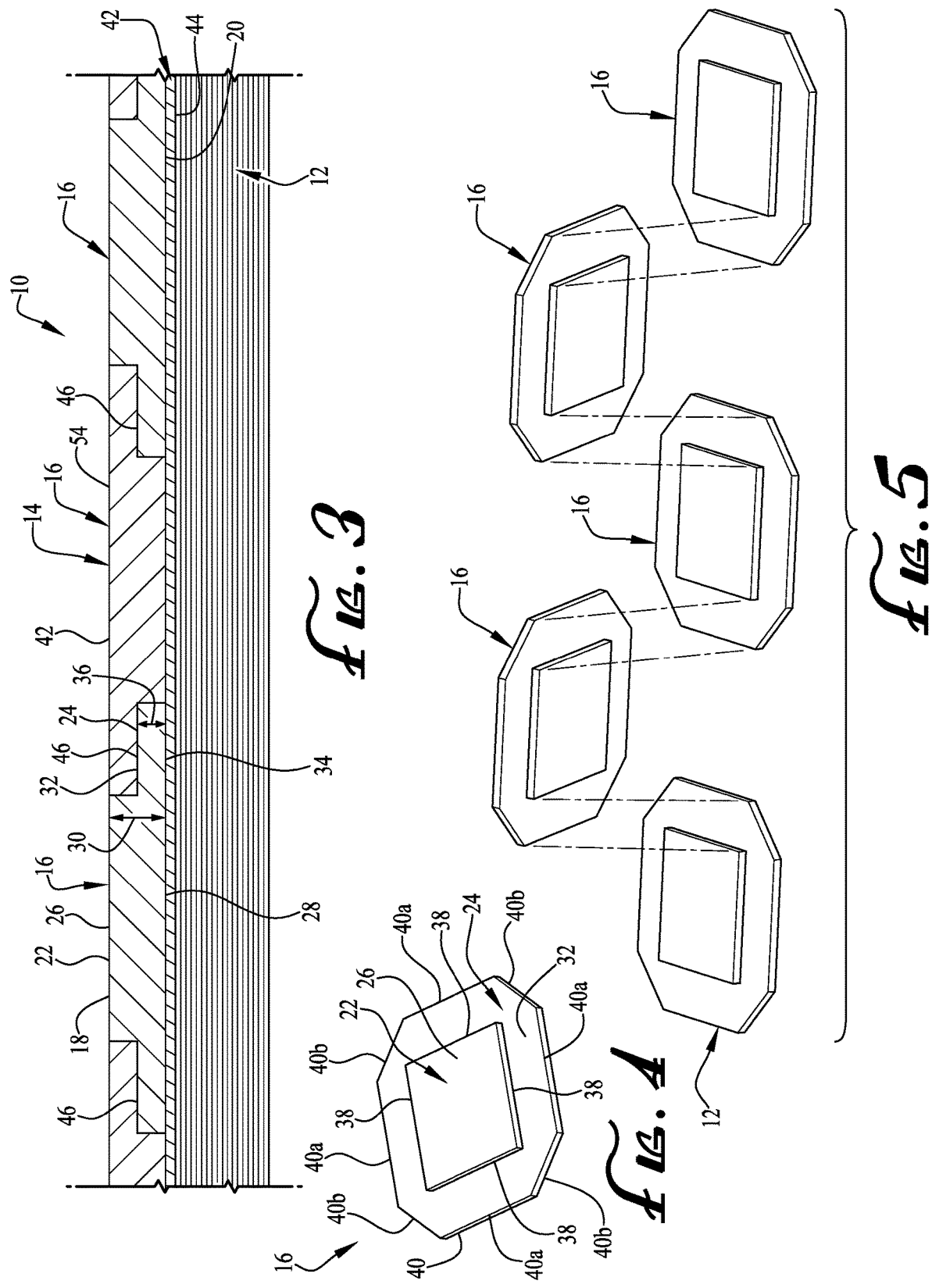

POLYMER MATRIX-CERAMIC MATRIX HYBRID COMPOSITES FOR HIGH THERMAL APPLICATIONS

CROSS-REFERENCE TO RELATED APPLICATIONS

This application is a divisional application of U.S. patent application Ser. No. 15/057,971 entitled "Polymer Matrix-Ceramic Matrix Hybrid Composites for High Thermal Applications," filed Mar. 1, 2016. This application claims priority from U.S. Patent Application Ser. No. 62/216,190 entitled "Polymer Matrix-Ceramic Matrix Hybrid Composites for High Thermal Applications," filed Sep. 9, 2015, the entirety of which is incorporated herein by reference.

BACKGROUND

The invention is directed to the heat protection of structure surfaces and components (such as structure surfaces and components of aircraft, aero structure surfaces, engine, missile and rocket components) which are exposed to high temperatures, such as temperatures 650° F.-2000° F. Traditionally these structure surfaces and components are made from high temperature metal alloys. High temperature metal alloys are generally high density and add weight to the aircraft, aircraft engine or missile and rocket structures. Alternatively, or in addition, these structure surfaces and components are heat shielded by being covered with a heat protective material. For complex component surfaces, however, such heat shielding can be difficult to apply and maintain.

PMC's (polymer matrix composites) have been used as a lighter weight alternative for metal structures in aircraft, aircraft engine, missile and rocket applications. PMC's have high tensile and compressive properties making them an appropriate replacement for titanium structures in a high stress environment. Some PMC's (e.g., polyimide PMC's) provide effective heat shielding up to about 650° F. PMC's cannot, however, provide effective heat shielding above 650° F.

Oxide ceramic composites (Ox/Ox CMC's), on the other hand, can be used to provide effective heat shielding in applications up to about 2000° F. Ox/Ox CMC's have high temperature resistance and very low thermal conductivity, but have relatively low compressive strength and are difficult to attach due to their low bearing strength.

Heat shielding with some form of high temperature PMC/CMC hybrid is possible, but there are problems associated with such hybrid structures. Because the thermal expansion rates of Ox/Ox CMC's and PMC's are markedly different, as the hybrid structure heats up, the mismatch in thermal expansion causes the Ox/Ox CMC to delaminate and disbond from the PMC. This delamination problem limits the maximum size for PMC/CMC hybrid surfaces. The ability to use PMC/CMC hybrids has been limited to small structures, whereas, some jet engine structures, such as exhaust ducts, may require components over 60 inches long and 50 inches in diameter.

Assembling small Ox/Ox CMC tiles into a tessellated pattern attempts to deal with the size issue, but does not completely solve the thermal protection challenge. As illustrated in FIG. 1, Ox/Ox CMC tile patterns 2 relying on butt joints 4 are inadequate because the mismatch in thermal expansion rate causes butt joints to separate—thereby allowing hot gases 6 to readily penetrate the Ox/Ox CMC 2 tile layer to reach the PMC layer 8. Tile patterns relying on lap joints seem possible, but no lap laminate pattern has been suggested which has suitable overlap joints on all sides of the laminate, while keeping the overall size of the Ox/Ox CMC tile to a minimum.

There is a need, therefore, for a high temperature composite which avoids the aforementioned problems in the prior art.

SUMMARY OF THE INVENTION

The invention satisfies this need. In one aspect, the invention is a combination comprising (a) a component having a surface; and b) a heat shielding composite attached to the surface of the component. The composite is adapted for providing heat shielding to the surface of the component and comprises: i) a PMC layer; and ii) a tile layer bonded to the PMC layer, the tile layer comprising a plurality of Ox/Ox CMC tiles, wherein at least some of the tiles are inverted tiles disposed with respect to an adjoining tile. The bottom surface of the outer portion is disposed flush with the bottom surface of the central portion. Each central portion periphery segment of a tile abuts or is in very close proximity to an outer portion periphery segment of another tile, and each outer portion periphery segment of a tile abuts or is in very close proximity to either a central portion periphery segment or to an outer portion periphery segment of another tile, such that the tile layer forms a smooth continuous top surface and a smooth continuous bottom surface. Optionally, each of the plurality of Ox/Ox CMC tiles of the composite comprise a ceramic matrix portion and a structural fiber. The ceramic matrix portion can comprise a metal oxide, and the metal oxide can comprise one or more of the following: aluminum oxide, silicon oxide, yttrium oxide, zirconium oxide, hafnium oxide. Optionally, the structural fiber comprises carbon fiber. Optionally, the one or more overlap joints comprise at least about 50% of a surface area of the Ox/Ox CMC tile. Optionally, the outer portion periphery segments which are not configured to match the configuration of a central portion periphery segment are configured to match the configuration of other outer portion periphery segments which are not configured to match the configuration of a central portion periphery segment. Optionally, the PMC layer comprises a polymeric matrix and a structural fiber. Optionally, the tile layer is bonded to the PMC layer using the adhesive properties of the PMC layer via co-curing of the PMC layer over the tile layer. Optionally, the combination can further comprise a bonding layer disposed between the tile layer and the PMC layer, bonding the tile layer to the PMC layer.

In another aspect, the invention is a method of employing the composite of the invention to heat shield a component. The method comprises the steps of a) providing the composite according to the first aspect of the invention; and b) applying the composite to a surface of the component.

DRAWINGS

These and other features, aspects and advantages of the present invention will become better understood with reference to the following description, appended claims, and accompanying drawings where:

FIG. 1 is a cross-sectional side view of a PMC/CMC hybrid of the prior art;

FIG. 2 is a perspective view of a first embodiment of a composite having features of the invention;

FIG. 3 is a cross-sectional view of the composite illustrated in FIG. 2, taken along line 3-3;

FIG. 4 is a perspective view of a first Ox/Ox CMC tile useable in the invention;

FIG. 5 is an exploded view of an tile layer using tiles of the type illustrated in FIG. 4;

DETAILED DESCRIPTION OF THE INVENTION

Figure 6:
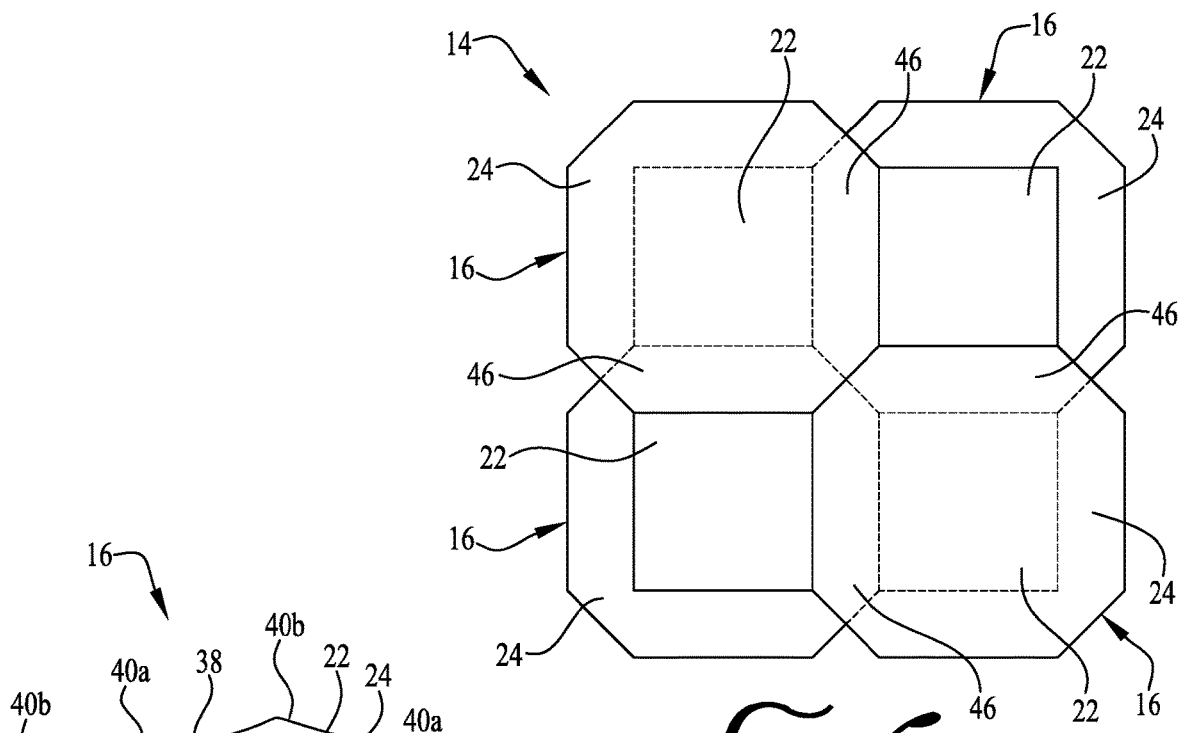
FIG. 6 is a plan view illustrating the tile layer of FIG. 5.

The following discussion describes in detail one embodiment of the invention and several variations of that embodiment. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

In a first aspect, the invention is a composite 10 comprising a PMC layer 12 and a tile layer 14 comprising a plurality of Ox/Ox CMC tiles 16 bonded to the PMC layer 12.

The PMC layer 12 can be any combination of a polymeric matrix and structural fiber, but preferably a high temperature resin matrix such as Polyimide/Carbon fiber, Bismaleimide/Carbon Fiber, Epoxy/Carbon Fiber, or any combination using an astroquartz, fiberglass, ceramic or other organic or inorganic structural fiber composition. The PMC layer 12 can be any thickness, but typically the PMC layer 12 is between about 0.050 inch and about 0.5 inch in thickness based on the structural requirements of the component.

The tile layer 14 has a smooth top surface 18 and a smooth bottom surface 20 thus enabling an aerodynamic composite outer surface 54 and a flat bonding surface for the PMC layer 12. The plurality of Ox/Ox CMC tiles 16 each comprise a ceramic matrix portion and a structural fiber. The ceramic matrix portion consists of a metal oxide including, but not limited to, aluminum oxide, silicon oxide, yttrium oxide, zirconium oxide, hafnium oxide, singularly or in combination. The structural fiber can be an oxide fiber such as 3M Nextel 312, 440, 610 or 720.

The plurality of Ox/Ox CMC tiles 16 are preferably of uniform size and shape to minimize manufacturing costs. The plurality of Ox/Ox CMC tiles 16 can be any size, but preferably are small, and preferably have a surface area of 16 square inches or less.

Each of the Ox/Ox CMC tiles 16 comprises a central portion 22 and an outer portion 24. The central portion 22 has a smooth central portion top surface 26, a smooth central portion bottom surface 28 and a uniform central portion thickness 30, typically between about 0.03" and about 0.5". The outer portion 24 has a smooth outer portion top surface 32, a smooth outer portion bottom surface 34 and a uniform outer portion thickness 36 which is one half of the central portion thickness 30. The central portions 22 and outer portions 24 of the plurality of Ox/Ox CMC tiles 16 can be any thickness.

The outer portion 24 is disposed surrounding the central portion 22, such that the bottom surface 34 of the outer portion 24 is flush with the bottom surface 28 of the central portion 22.

FIGS. 2-6 illustrate one typical embodiment of the invention. As illustrated in FIG. 2, the central portion 22 of each Ox/Ox CMC tile 16 has one or more central portion periphery segments 38 and the outer portion 24 of each Ox/Ox CMC tile 16 has one or more outer portion periphery segments 40. Each central portion periphery segment 38 is configured to match the configuration of an outer portion periphery segment 40. Outer portion periphery segments 40 which are not configured to match the configuration of a central portion periphery segment 38 are, instead, configured to match the configuration of other outer portion periphery sections 40 which are not configured to match the configuration of a central portion periphery segment 38.

In the embodiment illustrated in FIGS. 2-6, the top surface 26 of the central portion 22 is square, having four linear central portion periphery segments 38 of equal length. Also in this embodiment, the outer portion 24 is octagonal, having eight linear outer portion periphery segments 40. Four of the outer portion periphery segments 40a match the central portion periphery segments 38 by having the same length and linear shape as the central portion periphery segments 38. The other four outer portion periphery segments 40b are of equal length to one another and are also linear.

As illustrated in FIG. 3-6, the plurality of Ox/Ox CMC tiles 16 are assembled to form a tessellated tile layer 14. The plurality of Ox/Ox CMC tiles 16 are disposed with respect to one another such that each Ox/Ox CMC tile 16 is inverted with respect to an adjoining Ox/Ox CMC tile 16. Each central portion periphery segment 38 abuts or is in very close proximity to an outer portion periphery segment 40, and each outer portion periphery segment 40 abuts or is in very close proximity to either a central portion periphery segment 38 or to an outer portion periphery segment 40—such that the tile layer 14 is formed with a smooth continuous top surface 18 and, preferably, a smooth continuous bottom surface 20.

As illustrated in FIG. 3, the tile layer 14 comprising a plurality of pre-cured and sintered Ox/Ox CMC tiles 16 is bonded to the PMC layer 12 with a suitable bonding layer 42. The tile layer 14 can also be bonded to the PMC layer 12 using the adhesive properties of the PMC layer 12 via the co-curing of the PMC layer 12 over the tile layer 14.

As can be readily seen in FIGS. 3-6, the outer portion 24 of each Ox/Ox CMC tile 16 in the tile layer 14 overlaps the outer portion 24 of an adjoining Ox/Ox CMC tile 16 so that hot gases entering the top surface 18 of the tile layer 14 between abutting periphery segments 38, 40 cannot travel in the same direction through to a top surface 44 of the PMC layer 12 (as is the case in the prior art tile layer illustrated in FIG. 1). This results in one or more overlap joints 46. To reach the top surface 44 of the PMC layer 12, any hot gases entering the top surface 18 of the tile layer 14 must, not only travel between abutting periphery segments 38, 40, but also must travel laterally between the overlap joints 46 of the outer portions 24 of adjoining Ox/Ox CMC tiles 16 (as illustrated in FIG. 3). The resulting one or more overlap joints 46 prevent a heat source from direct angle of contact with the PMC layer 12. To minimize the travel of hot gases entering the top surface 18 of the tile layer 14 to the top surface 44 of the PMC layer 12, it is preferred that the overlap joints 46 formed between the outer portion 24 of any one Ox/Ox CMC tile 16 with the outer portions 24 of adjoining Ox/Ox CMC tiles 16 within tile layer 14 be at least about 50% of the Ox/Ox CMC tile's 16 surface area to maximize the bond surface of the Ox/Ox CMC tile 16 to the PMC layer 12. The one or more overlap joints 46 are intended to act as a non-bonded thermal expansion joint allowing for changes in the thermal growth of the tile layer 14 and the PMC layer 12, while still protecting the underlying PMC layer 12 and structure from the extreme heat on the external surface.

Figure 7:
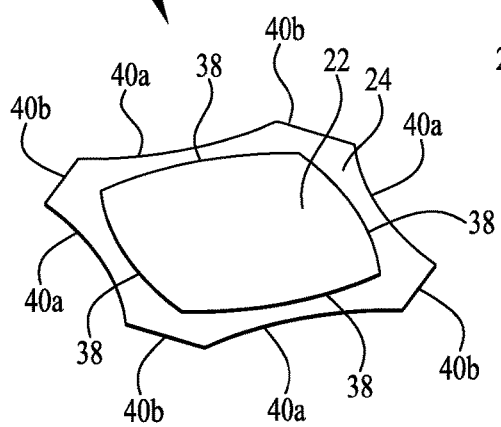
FIG. 7 is a perspective view of a second Ox/Ox CMC tile useable in the invention.
Figure 8:
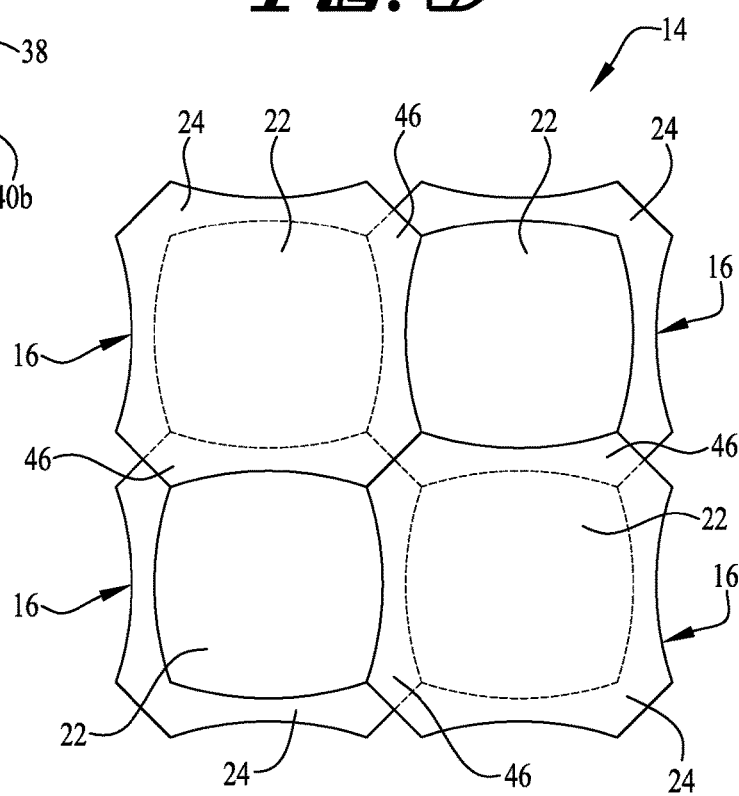
FIG. 8 is a plan view illustrating a tile layer having features of the invention and using tiles of the type illustrated in FIG. 7.

Other Ox/Ox CMC tile shapes 16 can also be used in the invention, so long as they meet the criteria described above. FIGS. 7 and 8, for example, illustrate a symmetric non-square Ox/Ox CMC tile 16 and a tessellated tile layer 14 using such Ox/Ox CMC tiles 16. Ox/Ox CMC tiles 16 having the shapes of triangles, diamonds and parallelograms can also be used in the invention if properly dimensioned—as can some other polygons.

Figure 9A:
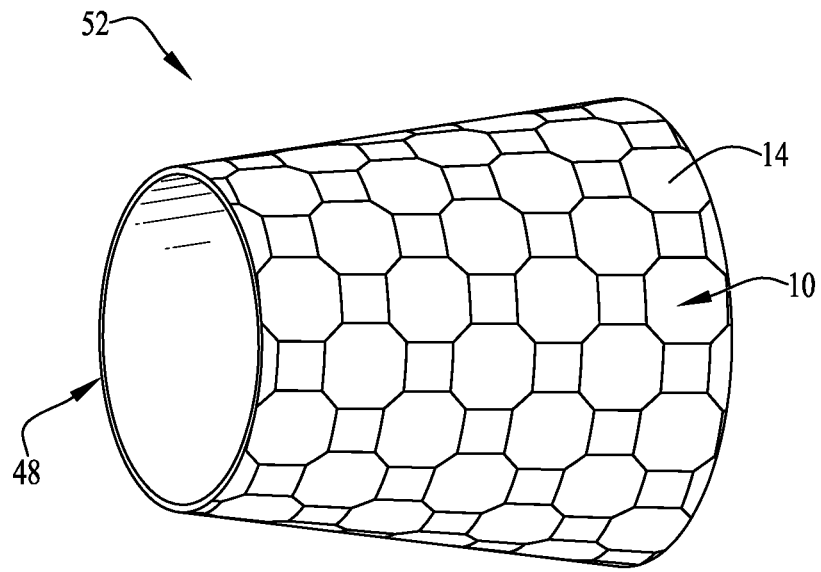
FIG. 9A is a perspective view illustrating a composite disposed on the exterior surface of a truncated cone.

The invention can be used to protect flat surfaces as illustrated is FIGS. 2-8. It can also be used to protect most non-flat surfaces. FIGS. 9A and 9A, for example, illustrate the use of the plurality of Ox/Ox CMC tiles 16 shown in FIGS. 2-6 in the invention to protect the outer surface of a truncated cone 48 and the inner surface of a truncated cone 50, respectively. Such truncated cones can be used, for example, as engine exhaust ducts 52.

The edges of the tile layer 14 can be completed in a variety of ways depending on the particular application. For parts where coverage of the tile layer 14 is not over 100% of the part, the overlapping plurality of Ox/Ox CMC tiles 16 can simply be cut and carbon fiber within the overlapping Ox/Ox CMC tiles 16 can be wrapped over the tile layer 14 and cured. For parts where the Ox/Ox CMC tile 16 goes to the edge of the part, the distal-most Ox/Ox CMC tiles 16 can be machined with the carbon fiber leaving a straight edge of ceramic and carbon fiber. In unusual situations the edges can be completed with special close-out Ox/Ox CMC tiles 16.

In a typical method of making the composite 10 of the invention, the immediately following process steps could be used to produce the composite 10 illustrated in FIGS. 2-6 for protection of a flat surface.

CMC material is cut into net sized octagonal and square shapes, forming plies. The plies are then stacked in a net mold (plate). The mold is fabricated using either steel, aluminum, invar, carbon fiber composite, in a thickness greater than the thickness of the tile being formed. If the intent is to form a 10 ply or 0.1" thick thermal layer, a 5 ply octagon tile is combined with a 5 ply square tile in the center. The mold can have an accompanying cover caul to allow for net molding of both the octagon shape and the square shape in one process.

After the CMC material is cut to size, the 5 octagon plies can be placed inside the mold cavity and debulked using a vacuum bag. Once the vacuum bag is removed, the cover caul is placed on top of the ceramic material and the 5 square shaped tiles are added to the center of the cover caul cavity. The mold is bagged, cured and sintered in an appropriate process for the specific ceramic material.

To form the composite 10, the Ox/Ox CMC tiles 16 are arranged on a flat table, with each Ox/Ox CMC tile 16 forming a perfect tessellation pattern by turning the Ox/Ox CMC tiles 16 over to nest with no gap. This forms the tile layer 14. The PMC layer 12 is then added to the ceramic tile layer 14 and co-cured to the Ox/Ox CMC tiles 16 using conventional means. Following de-molding, the excess resin is removed and the insulated laminate is machined for final use. The edges of the ceramic tiles 16 can be encapsulated by the composite material, or run to the edge of the laminate and machined with the final dimensions of the PMC layer 12.

For complex contours, a similar process can be employed using specific shaped tiles for each location. The ceramic tiles 16 are formed to match the contours of the structure at each location. The thickness of the tiles 16 can vary in relationship to the thermal protection necessary for each area of the structure.

The process to apply the PMC layer 12 over the ceramic tile layer 14 can be prepreg hand layup, wet layup, fiber placement, automated tow placement, resin transfer molding (RTM), vacuum assisted resin transfer molding (VARTM), or any other process that combines a structural composite fiber with a resin like matrix. The molding process can include traditional composite processing techniques including autoclave, oven, compression molding and the various resin infiltration processes including RTM, VARTM and vacuum bag wet layup.

The composite 10 has a smooth, aerodynamic outer surface 54 appropriate for gas path surfaces in gas turbine engines.

The composite 10 of the invention provides several important advantages:

The ability to create a thermally protected surface over 100% of the area of a part with relatively small tiles that reduce the thermal strain on the bond surface;

The ability to create an un-bonded gap free joint design protecting the underlying PMC substrate from direct heat; and The ability to protect complex contours incorporating formed CMC tiles and molded PMC.

In another aspect, the invention is a method of employing the composite to hear shield a component. The method comprises the steps of a) providing the composite according to the first aspect of the invention; and b) applying the composite to a surface of the component.

The composite 10 of the invention can be effectively used to provide heat shielding of aircraft and aero structure surfaces, engine components, and missile and rocket components made from metal alloys and other non-hybrid materials.

Figure 9B:
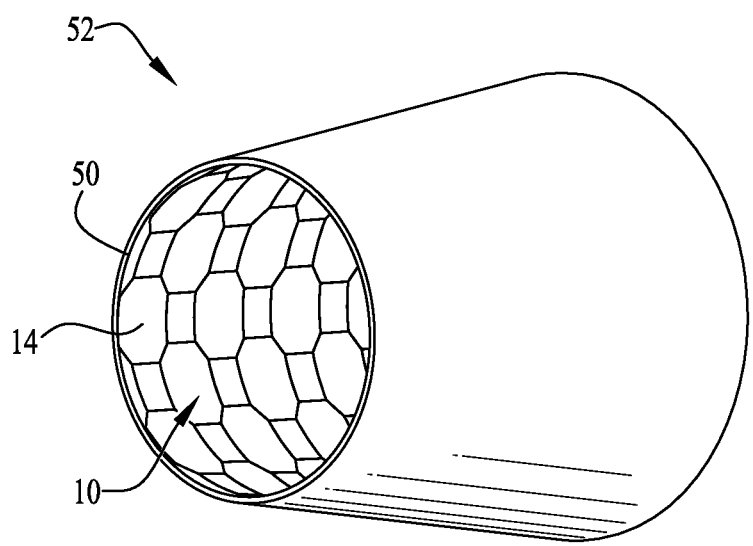
FIG. 9B is a perspective view illustrating a composite disposed on the interior surface of a truncated cone.

For many aircraft and aero structures, the composite 10 of the invention can be effectively used to create the structures themselves, avoiding the cost and weight disadvantages of structures made from metal alloys. Such composite structures are inherently heat protected. Examples of aircraft and aero structures which can be made from the composite 10 of the invention includes engine exhaust ducts 52 (illustrated in FIGS. 9A and 9B), such as for stealth aircraft, hot trailing edges for military aircraft, gas washed surfaces on military aircraft, commercial engine pylons, commercial engine core cowls, exhaust nozzle centerbodies and divergent flaps and seals for military aircraft, missile and rocket radomes, fins and fairings.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A combination comprising:
    a) a component having a surface; and
    b) a heat shielding composite attached to the surface of the component, the composite adapted for providing heat shielding to the surface of the component and comprising:
        i) a PMC layer; and
        ii) a tile layer bonded to the PMC layer, the tile layer comprising a plurality of Ox/Ox CMC tiles, each Ox/Ox CMC tile comprising:
            1) a central portion comprising a bottom surface, a top surface, and one or more central portion periphery segments;
            2) an outer portion disposed surrounding the central portion, the outer portion comprising a bottom surface and one or more outer portion periphery segments;
            wherein the bottom surface of the outer portion is disposed flush with the bottom surface of the central portion;
            wherein each central portion periphery segment of a tile abuts or is in very close proximity to an outer portion periphery segment of another tile, and each outer portion periphery segment of a tile abuts or is in very close proximity to either a central portion periphery segment or to an outer portion periphery segment of another tile, such that the tile layer forms a smooth continuous top surface and a smooth continuous bottom surface; and
            wherein at least some of the tiles are inverted tiles disposed with respect to an adjoining tile; and
            3) one or more overlap joints formed by the overlapping of the outer portion of a tile and the outer portion of an adjoining tile, so that hot gases entering the smooth top surface of the tile layer between abutting outer and central periphery segments must travel laterally between the overlapping outer portions of adjoining tiles to reach the top surface of the PMC layer.

2. The combination of claim 1, wherein each of the plurality of Ox/Ox CMC tiles of the composite comprise a ceramic matrix portion and a structural fiber.

3. The combination of claim 2, wherein the ceramic matrix portion comprises a metal oxide.

4. The combination of claim 3, wherein the metal oxide comprises one or more of the following: aluminum oxide, silicon oxide, yttrium oxide, zirconium oxide, hafnium oxide.

5. The combination of claim 2, wherein the structural fiber comprises carbon fiber.

6. The combination of claim 1, wherein the one or more overlap joints comprise at least about 50% of a surface area of the Ox/Ox CMC tile.

7. The combination of claim 1, wherein the outer portion periphery segments which are not configured to match the configuration of a central portion periphery segment are configured to match the configuration of other outer portion periphery segments which are not configured to match the configuration of a central portion periphery segment.

8. The combination of claim 1, wherein the PMC layer comprises a polymeric matrix and a structural fiber.

9. The combination of claim 1, wherein the tile layer is bonded to the PMC layer using the adhesive properties of the PMC layer via co-curing of the PMC layer over the tile layer.

10. The combination of claim 1, further comprising a bonding layer disposed between the tile layer and the PMC layer, bonding the tile layer to the PMC layer.

11. The combination of claim 1, wherein all of the tiles are inverted tiles disposed with respect to an adjoining tile.

12. A combination comprising:
    a) a component having a surface; and
    b) a heat shielding composite attached to the surface of the component, the composite adapted for providing heat shielding to the surface of the component and comprising:
        i) a PMC layer; and
        ii) a tile layer bonded to the PMC layer, the tile layer comprising a plurality of Ox/Ox CMC tiles, wherein at least some of the tiles are inverted tiles disposed with respect to an adjoining tile.

13. The combination of claim 12, wherein each of the plurality of Ox/Ox CMC tiles of the composite comprise a ceramic matrix portion and a structural fiber.

14. The combination of claim 13, wherein the ceramic matrix portion comprises a metal oxide.

15. The combination of claim 14, wherein the metal oxide comprises one or more of the following: aluminum oxide, silicon oxide, yttrium oxide, zirconium oxide, hafnium oxide.

16. The combination of claim 13, wherein the structural fiber comprises carbon fiber.

17. The combination of claim 12, wherein the PMC layer comprises a polymeric matrix and a structural fiber.

18. The combination of claim 12, wherein the tile layer is bonded to the PMC layer using the adhesive properties of the PMC layer via co-curing of the PMC layer over the tile layer.

19. The combination of claim 12, further comprising a bonding layer disposed between the tile layer and the PMC layer, bonding the tile layer to the PMC layer.

20. A method of heat shielding a component with a heat shielding composite comprising:
    a) a PMC layer; and
    b) a tile layer bonded to the PMC layer, the tile layer comprising a plurality of Ox/Ox CMC tiles, each Ox/Ox CMC tile comprising:
        i) a central portion comprising a bottom surface, a top surface, and one or more central portion periphery segments;
        ii) an outer portion disposed surrounding the central portion, the outer portion comprising a bottom surface and one or more outer portion periphery segments;
        wherein the bottom surface of the outer portion is disposed flush with the bottom surface of the central portion;
        wherein each central portion periphery segment of a tile abuts or is in very close proximity to an outer portion periphery segment of another tile, and each outer portion periphery segment of a tile abuts or is in very close proximity to either a central portion periphery segment or to an outer portion periphery segment of another tile, such that the tile layer forms a smooth continuous top surface and a smooth continuous bottom surface; and wherein at least some of the tile are inverted tiles with respect to an adjoining tile; and iii) one or more overlap joints formed by the overlapping of the outer portion of a tile and the outer portion of an adjoining tile, so that hot gases entering the smooth top surface of the tile layer between abutting outer and central periphery segments must travel laterally between the overlapping outer portions of adjoining tiles to reach the top surface of the PMC layer;

wherein the composite is adapted for providing heat shielding to a surface of the component;

the method comprising the steps of:

a. providing the composite; and b. applying the composite to a surface of the component.

* * * * *